United States Patent Office 3,793,441
Patented Feb. 19, 1974

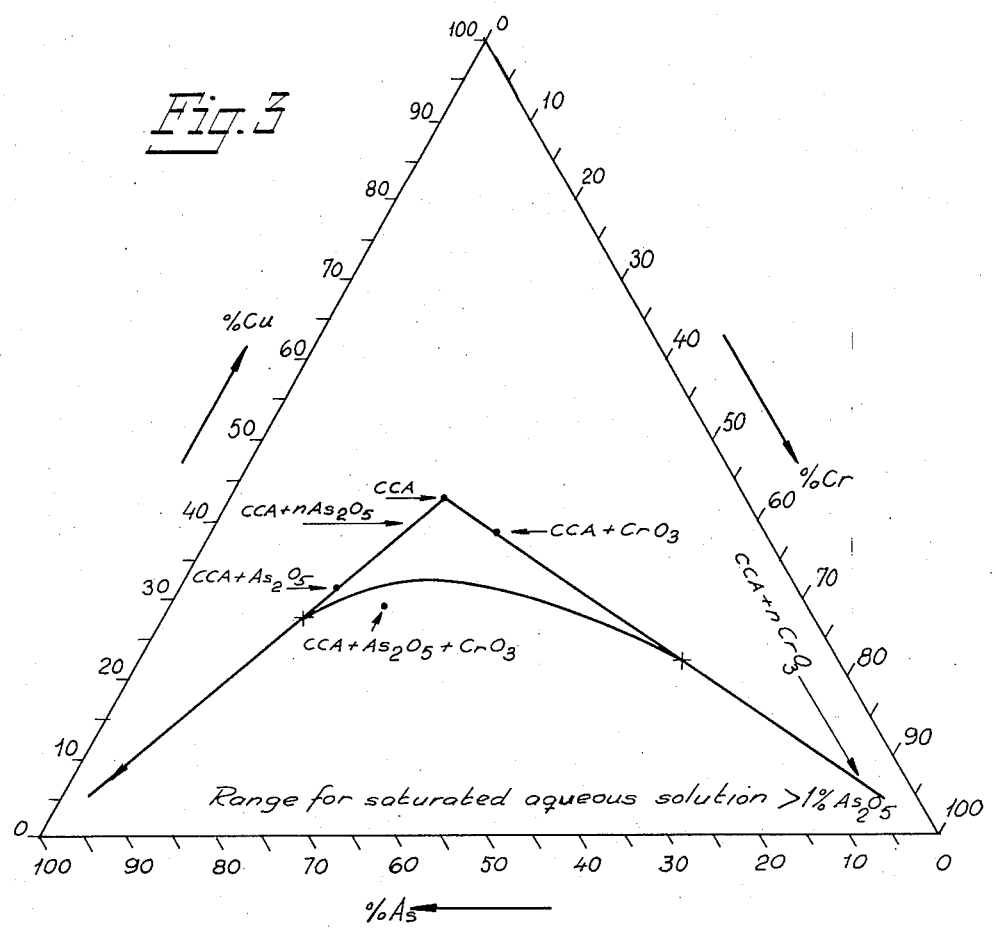

3,793,441
COPPER-CHROMATE-ARSENATE COMPOUND AND A PROCESS FOR MAKING THE COMPOUND
Sten Tycho Henriksson and Stig Osten Lindstrom, Skelleftehamn, Sweden, assignors to Boliden Aktiebolag, Stockholm, Sweden
Filed Dec. 18, 1968, Ser. No. 784,838
Claims priority, application Sweden, Dec. 29, 1967, 18,073/67
Int. Cl. C01b 27/02, 27/00
U.S. Cl. 423—595        1 Claim

ABSTRACT OF THE DISCLOSURE

A novel compound comprising copper, chromium, arsenic, hydrogen and oxygen, in which chromium is present in hexavalent form and arsenic in pentavalent form. There is also provided a process for producing the compound, in which a copper compound is added to a concentrated solution of chromic acid and arsenic acid.

---

The present invention is concerned with a chemical compound comprised of copper, chromium, arsenic, hydrogen and oxygen. The compound has been designated copper-chromate-arsenate and can be used as an ingredient of preserving solutions and the like. Chromium is present in the compound in hexavalent form, and arsenic in pentavalent form.

The compound has not previously been described in chemical technical literature, and neither has it been included in available X-ray diffraction tables used in identifying chemical compounds.

The copper chromate arsenate compound, called in the following CCA, has the following formula:

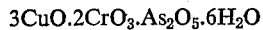

$$3CuO \cdot 2CrO_3 \cdot As_2O_5 \cdot 6H_2O$$

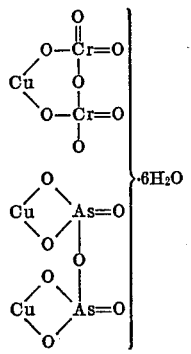

The different components have been determined by quantitative chemical analysis, the results being shown in the table below. The values obtained by analysis fully coincide with the values reached when applying the above formula:

Quantitative chemical analysis:

|  | Percent |
|---|---|
| CuO | 30.7 |
| $CrO_3$ | 25.7 |
| $As_2O_5$ | 29.6 |
| $H_2O$ | 14.0 |
| Total | 100.0 |

CCA crystallizes in the form of platelets or needles generally between 1 and 10 μm in size. The crystal form is triclinic. The crystals have a high index of refraction and a brilliant appearance, particularly in aqueous suspension, and are yellow to yellowish-red in color.

The results of X-ray diffraction analysis on CCA, using a diffractometer and CuKα-radiation, are shown in the following table. I represents the radiation intensity and d the space lattice or interatomic distance.

| I | dA. | I | dA. |
|---|---|---|---|
| 4 | 7.83 | 1 | 3.49 |
| 20 | 6.49 | 5 | 3.4 |
| 10 | 5.6 | 7 | 3.24 |
| 12 | 5.17 | 8 | 3.2 |
| 18 | 5.07 | 20 | 3.09 |
| 40 | 4.60 | 35 | 3.07 |
| 2 | 4.39 | 7 | 2.97 |
| 1 | 4.26 | 28 | 2.90 |
| 18 | 4.22 | 4 | 2,89 |
| 2 | 3.92 | 18 | 2.88 |
| 10 | 3.87 | 3 | 2.86 |
| 15 | 3.80 | 25 | 2.83 |
| 4 | 3.77 | 10 | 2.79 |
| 2 | 3.65 | 3 | 2.68 |
| 11 | 3.58 | 1 | 2.66 |

Figure 1:
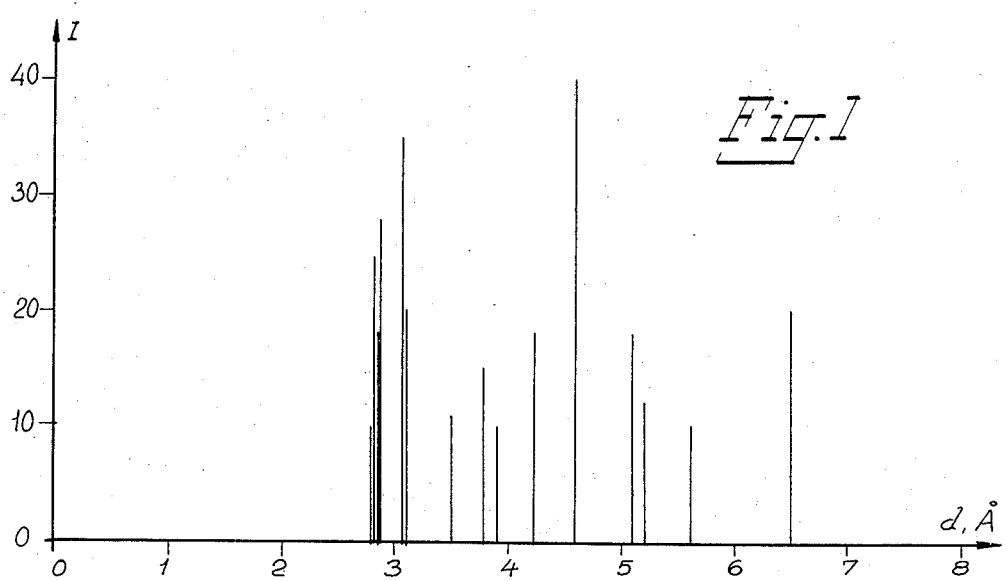

The strongest reflections obtained on X-ray diffraction have been plotted in FIG. 1. The length of the crystal axes and the angles therebetween, together with the volume (V) of the elementary cell can be calculated from the above figures; the following values being obtained:

$a = 10.2$ A         $\alpha = 91.5°$
$b = 13.0$ A         $\beta = 65.3°$
$c = 11.4$ A         $\gamma = 85.3°$
$V = 1365$ A$^3$ The density of the compound is 3.21 and its molecular weight 776.54.

CCA can only be formed under special conditions, which possibly explains why the compound has not previously been produced or described.

The special conditions under which CCA is formed can be summarized as follows:

(1) The compound is only formed in concentrated systems with high activities of the components included therein.
(2) The system must be pure, i.e. essentially totally free from impurities and foreign substances when these impair or prevent the formation and crystallization of CCA.
(3) The reaction system should be heated, in order to obtain a sufficiently high reaction velocity.

Although it is not known for certain, the formation of CCA is probably highly dependent upon the manner in which the different components are introduced to the reaction mixture. For instance, it has been found that it is impossible to form the compound when using certain starting substances or combinations thereof. A preferred process for producing the compound is based on the use of arsenic acid and chromic acid together with one or more of the copper compounds: copper arsenate, copper chromate, copper carbonate, copper oxide and copper hydroxide. Naturally it is also possible to use other compounds, although those aforementioned have been found best suited since they do not give rise to foreign substances in the system.

A preferred copper arsenate is the crystalline diarsenate $CuHAsO_4 \cdot H_2O$. This consists of blue-green crystals, suitably 10–30μm. in size. The arsenate can be prepared in a known manner from copper sulphate and arsenic acid, and is obtained in a very pure form with a maximum impurity content not exceeding 0.001–0.01%.

When producing the compound, arsenic acid and chromic acid are suitably mixed and dissolved in water. The copper arsenate is then added to the solution, the concentration of the system being such that the arsenate is partially dissolved and partially suspended in solid phase. The copper arsenate is added in quantities which permit the system to be stirred and worked relatively easily. Accordingly, the concentration of $As_2O_5$ must not fall below 33–34% $As_2O_5$, which is the lower limit of the range in which CCA can exist. At lower concentrations CCA is hydrated to arsenic acid, chromic acid and several different basic copper arsenates.

The following quantities, for example, can be used per ton of reaction mixture:

|  | Kg. |
|---|---|
| CuO | 140 |
| $CrO_3$ | 260 |
| $As_2O_5$ | 330 |
| $H_2O$ | 270 |
| Total | 1000 |

Figure 2:
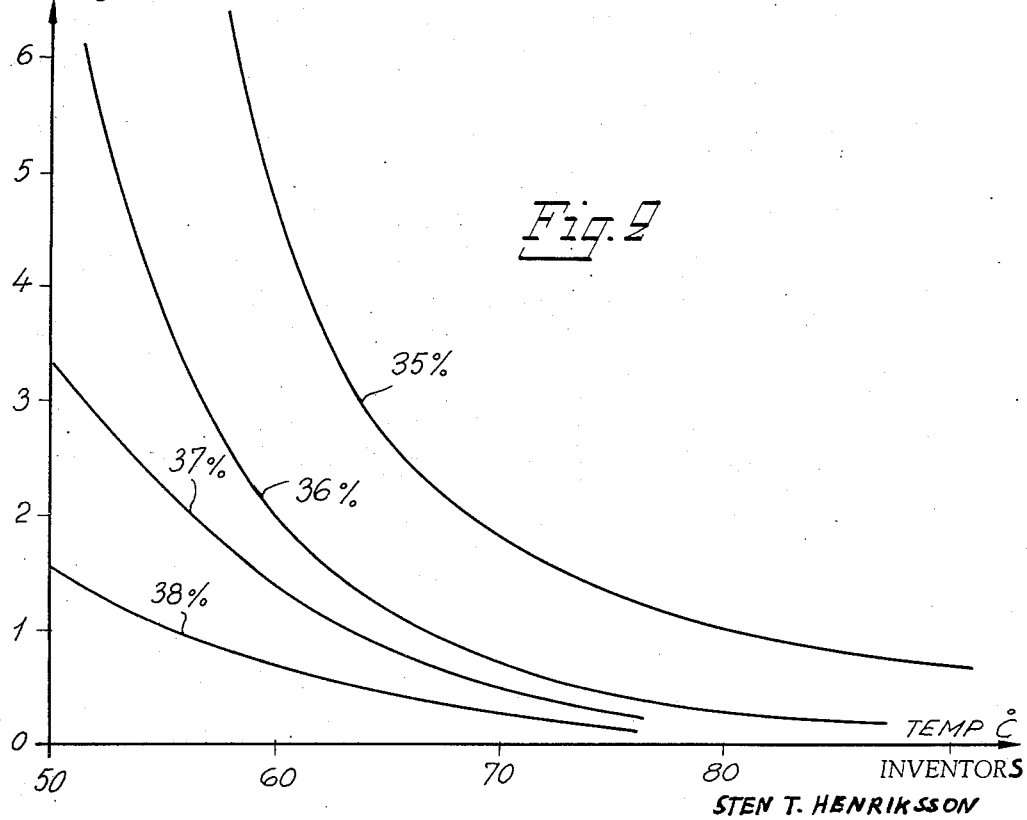

The reaction takes place under the influence of heat and it is possible to trace the phase conversion from $CuHAsO_4 \cdot H_2O$ to CCA direct, by the change in color of the system to yellowish-red and brilliant CCA. FIG. 2 shows the reaction velocity as a function of the temperature at different concentrations (given as percent $As_2O_5$ in the system). The velocity increases greatly with increasing temperature. The reaction temperature should normally exceed 50° C. Upon termination of the reaction, CCA is removed by filtration, and washed. The reaction yield of CCA is about 30% of the weight of the reaction mixture. The mother liquor and washing water is recirculated for renewed production processes. In continuous production processes, the mother liquor is regenerated after each filtering operation to a reaction solution by adding arsenic acid, chromic acid and a suitable copper compound, such as carbonate, oxide or hydroxide. The reaction solution can be considered a saturated solution of CCA in arsenic acid and chromic acid and may, for instance, have the following composition:

|  | Percent |
|---|---|
| $As_2O_5$ | 34 |
| $CrO_3$ | 26 |
| CuO | 8 |
| $H_2O$ | 32 |

When crystallized, $CuHAsO_4 \cdot H_2O$ is added to the solution and suspended therein; whereupon the solution is converted in solid phase to CCA, as previously described. The quantity of copper arsenate introduced to the system is, to a certain extent dependent on the technical apparatus used with regard to viscosity, filtering, agitation etc.

As previously mentioned, the formation of CCA is sensitive to impurities, of which particularly destructive impurities are Cr(III), Mn and Fe and alkali, and which should not be present in the system in quantities exceeding 0.05%. CCA can be washed clean on filters and dried without difficulty. It is a stable product, in the form of a durable yellowish-red powder.

The solubility factor of CCA in water at room temperature is about 1.4 grams per 1000 ml. $H_2O$.

CCA is much more soluble at lower pH-values, and hence when it is desired to produce more concentrated solutions arsenic acids or chromic acids or mixtures thereof can be added to increase the solubility of said compounds. Naturally, other acids may be used such as sulphuric acid or nitric acid, although in such instances foreign ions which may be deleterious to the final product are also added to the solution.

FIG. 3 shows the solublity of CCA in a system of chromic acid and/or arsenic acid. Stable solutions of CCA are possible in the area beneath the curve, in which the total concentration $As_2O_5$ is $\geq 1\%$, which is a concentration often used in certain applications. The axes of the graph denote weight procent of respective elements Cu-Cr-As. When using solely CCA it is not possible to obtain in an aqueous solution concentrations higher than about 0.5% $As_2O_5$, thus rendering the compound practically insoluble, as is evident from the graph.

FIG. 3 also shows the composition of CCA in mixture with varying quantities of arsenic ($CCA+n.As_2O_5$) and CCA with chromic acid ($CCA+n.CrO_3$). The positions where said lines first meet the solubility curve, correspond to the total composition of $CCA+n.As_2O_5$ which when dissolved in water gives a solution having a concentration of 1% $As_2O_5$. The value on $n$ is about 1.5 and about 8.0 for $As_2O_5$ and $CrO_3$, respectively. The graph also shows that one mole of CCA can be dissolved with a mixture of one mole of $As_2O_5$ and one mole of $CrO_3$ to concentration of more than 1% $As_2O_5$. On the other hand, a concentration of 1% $As_2O_5$ is not obtained with one mole of CCA per mole $As_2O_5$ or $CrO_3$.

The practical uses to which the compound CCA can be put are very extensive. In practice, combinations of hexavalent chromium, copper and pentavalent arsenic are used for treating metals in pickling and patinizing processes or anti-rust coating processes using metal arsenates. These compounds are also used for preserving organic materials such as wood, plastic or cellulose products and as ingredients in herbicides and insecticides. The advent of CCA which combines these elements in a solid powderous product has provided a practical preparation which is easy to handle and store and which is insensitive to storage conditions.

What is claimed is:

1. A novel chemical compound of copper, chromium, arsenic, hydrogen and oxygen, which can be used as a preserving agent for organic materials and for the surface treatment of metals, characterized in that it has the formula $$3CuO \cdot 2CrO_3 \cdot As_2O_5 \cdot 6H_2O\ (As_2Cr_2Cu_3H_{12}O_{29}),$$

forms triclinic, yellow to yellowish-red crystals having a density of 3.2 and the following X-ray diffraction data obtained with a diffractometer with $CuK\alpha$-radiation.

| I | dA | I | dA |
|---|---|---|---|
| 4 | 7.83 | 1 | 3.49 |
| 20 | 6.49 | 5 | 3.4 |
| 10 | 5.6 | 7 | 3.24 |
| 12 | 5.17 | 8 | 3.2 |
| 18 | 5.07 | 20 | 3.09 |
| 40 | 4.60 | 35 | 3.07 |
| 2 | 4.39 | 7 | 2.97 |
| 1 | 4.26 | 28 | 2.90 |
| 18 | 4.22 | 4 | 2.89 |
| 2 | 3.92 | 18 | 2.88 |
| 10 | 3.87 | 3 | 2.86 |
| 15 | 3.80 | 25 | 2.83 |
| 4 | 3.77 | 10 | 2.79 |
| 2 | 3.65 | 3 | 2.68 |
| 11 | 3.58 | 1 | 2.66 | from which the following crystal data can be determined

| a | 10.2 | A $\alpha$ | 91.5° |
|---|---|---|---|
| b | 13.0 | A $\beta$ | 65.3° |
| c | 11.4 | A $\gamma$ | 85.3° |
| V | 1365 | A³ | |

References Cited
UNITED STATES PATENTS 2,565,175   8/1951   Hager _____ 23—53 XR MILTON WEISSMAN, Primary Examiner U.S. Cl. X.R.

423—593, 601